United States Patent
McElroy et al.

[11] Patent Number: 5,901,461
[45] Date of Patent: May 11, 1999

[54] TOP BLOWER FOR A CAR WASH

[75] Inventors: Timothy Patrick McElroy; Christopher Patrick McElroy, both of Glendale; Lucian G. McElroy, Carefree, all of Ariz.

[73] Assignee: Proto-Vest, Inc., Glendale, Ariz.

[21] Appl. No.: 09/053,926

[22] Filed: Apr. 2, 1998

[51] Int. Cl.$^6$ ...................................................... F26B 19/00
[52] U.S. Cl. ................................ 34/233; 34/666; 15/316.1
[58] Field of Search ............................. 34/201, 233, 666; 15/312.1, 316.1, 405

[56] References Cited

U.S. PATENT DOCUMENTS

| | | | |
|---|---|---|---|
| 2,663,951 | 12/1953 | Kennison | 34/666 |
| 4,949,423 | 8/1990 | Larson et al. | 34/666 |
| 4,969,272 | 11/1990 | Schleeter et al. | 34/666 |
| 4,977,689 | 12/1990 | Belanger et al. | 34/666 |
| 4,979,316 | 12/1990 | Belanger et al. | 34/666 |
| 5,553,346 | 9/1996 | McElroy | 15/316.1 |

*Primary Examiner*—Henry A. Bennett
*Assistant Examiner*—Pamela A. Wilson
*Attorney, Agent, or Firm*—Howard & Howard

[57] ABSTRACT

An assembly for blowing liquids from the surfaces of a vehicle comprising support plenum (10) for distributing a stream of air to the surfaces of a vehicle, a blower (16) connected to said support plenum (10) for producing the stream of air, and an overhead bag (18) extending downwardly from the plenum (10) to a distal end. A nozzle is disposed at the distal end and includes a center section (20) having a length (Y) extending horizontally between ends for directing air against the top of a vehicle. The nozzle is characterized by including an inwardly directed end section (22) at each end of the center section (20) to define outward tips (24) of the nozzle for directing air downwardly and inwardly against the sides of a vehicle. A positioner (30) positions the vehicle to combine with the geometric configuration of the overhead bag (18) to assure that the stream of air emitted from the nozzle tips (24) impacts the sides of the vehicle.

17 Claims, 1 Drawing Sheet

TOP BLOWER FOR A CAR WASH

BACKGROUND OF THE INVENTION

1. Field of the Invention

The invention relates to a fluid stripping assembly for removing liquid from the surfaces of a vehicle.

2. Description of the Prior Art

Conventional car wash systems include a drying station near the exit of the car wash for drying rinse water from the surfaces of the vehicle. The sides of the vehicle are dried by stationary blower units located on the sides of the car wash line which include vertical nozzles. The top surface of the vehicle is dried by overhead nozzles. One such assembly is illustrated in U.S. Pat. No. 5,553,346 issued Sep. 10, 1996 in the name of McElroy, and owned by the assignee of the subject invention. The patent discloses the use of flexible, inflatable bags of generally rectangular cross section transversely of the bag with an inlet attached to a plenum for introducing air into the bag which inflates the bag and is emitted from a nozzle in the bag for impacting the vehicle.

Although the prior art assemblies are effective, there remains a need for an assembly which assures removal of liquid form various sizes of vehicles at the positions of the vehicle body where the top surfaces flow into the side surfaces.

SUMMARY OF THE INVENTION

An assembly for blowing liquids from the surfaces of a vehicle and comprising a support plenum for distributing a stream of air to the surfaces of a vehicle, a blower connected to the support plenum for producing the stream of air, and an overhead bag extending downwardly from the plenum to a distal end, at which is disposed a nozzle. The nozzle includes a center section, having a length extending horizontally between ends for directing air against the top of a vehicle. The nozzle is characterized by including an inwardly directed end section at each end of the center section to define outward tips of the nozzle for directing air downwardly against the sides of a vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
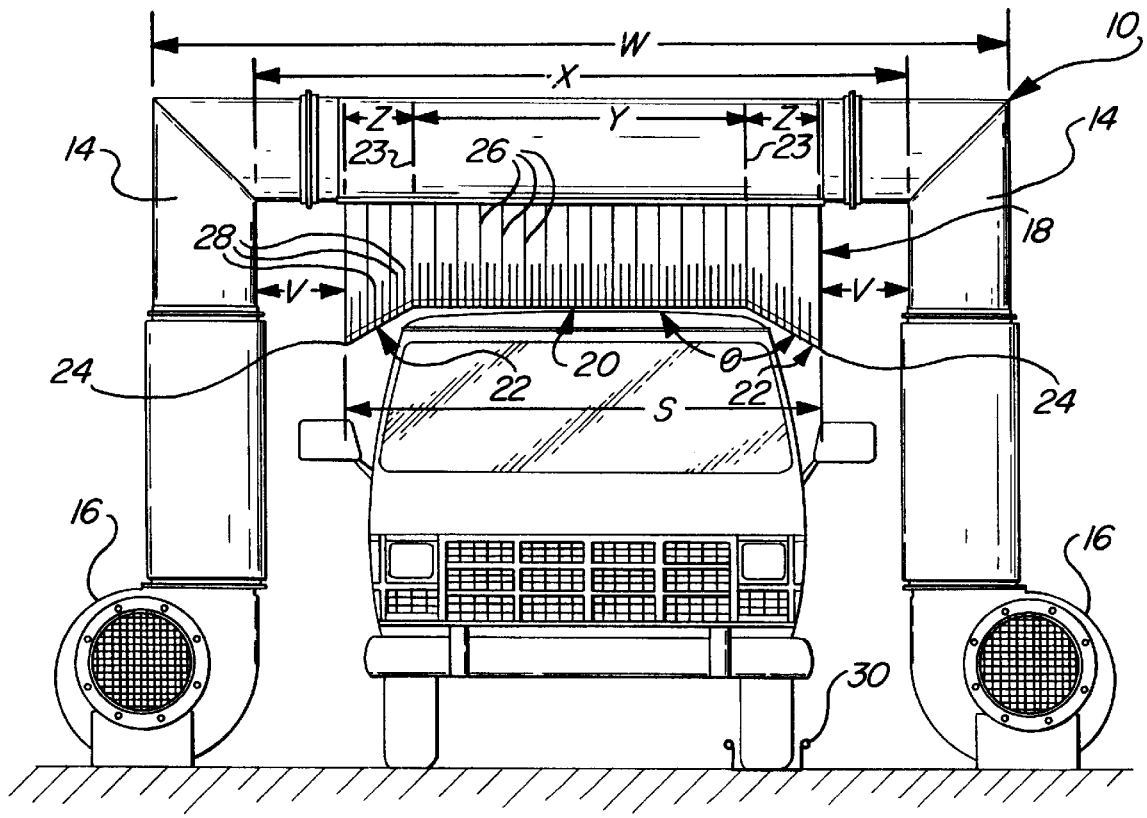
FIG. 1 is a front elevational view of a preferred embodiment with a van vehicle exiting.
Figure 2:
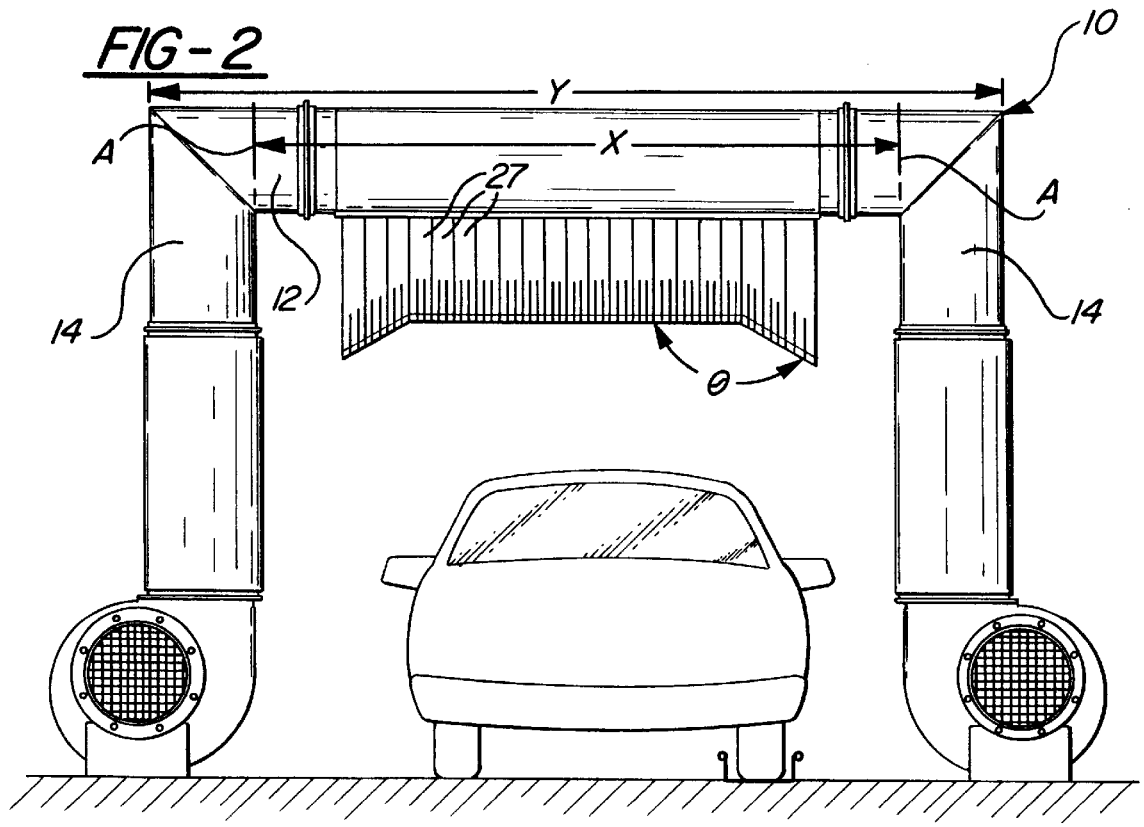
FIG. 2 is a front elevational view of the embodiment of FIG. 1 but showing a passenger vehicle exiting.

Referring to the Figures, wherein like numerals indicate like or corresponding parts throughout the several views, an assembly for blowing liquids from the surfaces of a vehicle is shown in FIGS. 1 and 2.

The assembly comprises a U-shaped support plenum, generally indicted at 10 for distributing a stream of air to the surfaces of a vehicle, a van, as shown in FIG. 1, or a passenger car, as shown in FIG. 2. The U-shaped plenum 10 includes an overhead support 12 and at least one and preferably two vertically extending side supports 14 for supporting the overhead support 12. The side supports have an inward vertical extremity lying in the planes indicated at A and the planes are separated by a horizontal distance X. The outer extremities of the vertical side supports 14 define the width W of the U-shaped plenum.

A blower 16 is connected to the bottom of each of the vertical side supports 14 of the support plenum 10 for feeding pressurized air into the supports 12 and 14. The supports 12 and 14 are circular in cross section.

An overhead bag 18 extends downwardly from the overhead support 12 of the plenum 10 to a distal end, at which is disposed a nozzle. The nozzle includes a center section 20 having a length Y extending horizontally between ends for directing a stream or sheet of pressurized air against the top of a vehicle.

The nozzle is characterized by including an inwardly directed end section 22 at each end 23 of the center section 20 to define outward tips 24 of the nozzle for directing air downwardly and against the sides of a vehicle and each of the end sections 22 extends a horizontal distance Z. The overhead bag 18 consists of fabric and includes major gussets 26 extending from the plenum 10 to the nozzle to divide the overhead bag 18 into panels 27. The overhead bag 18 also includes two minor gussets 28 in each panel or between next adjacent major gussets and extending inwardly into the overhead bag 18 from the nozzle a distance short of the plenum 10. These gussets keep the overhead bag 18 from ballooning.

Each of the panels 27 between major gussets 26 are four inches (4") in horizontal width with each of the end sections 22 including three of the panels 27 and the center section 20 including fifteen of the panels 27. Therefore, each of the end sections 22 extends a horizontal distance of twelve inches and the horizontal length of the center section 20 is sixty inches. The end sections 22 of the nozzle extend in a straight line at an obtuse angle $\theta$ of one hundred and thirty five degrees relative to the center section 20 of the nozzle, i.e., the end sections 22 of the nozzle extend at an included acute angle of forty five degrees relative to the center section 20 of the nozzle.

The object of the geometry of the assembly is to consistently direct a stream of air against the sides of a vehicle. Accordingly, the car wash includes a vehicle positioner 30 for positioning the sides of the vehicle horizontally inwardly of the tips 24 of the nozzle. One of the major gussets 26 is disposed at the intersection 23 of the center 20 and end 22 sections of the nozzle whereby one of the panels of each end section 22 is next adjacent the center section 20 of the nozzle. The vehicle positioner 30 is centered within the horizontal extent of that one of the panels.

The vertical inward or interior extremities A or the vertical supports 14 are spaced horizontally apart a distance X of one hundred fifteen inches and the horizontal distance S between the tips 24 of the end sections 22 is eighty four inches with the tips 24 being equally spaced a horizontal distance V from the vertical inward extremities A of the vertical supports 14. Each of the end sections 22 extends a horizontal distance Z which is fifteen to twenty five percent (15%–25%) of the horizontal width or length Y of the center section 20. Said another way, each of the end sections 22 extends a horizontal distance Z which is twenty percent (20%) of the horizontal length Y of the center section 20. Each of the end sections 22 extends a predetermined horizontal distance Z and the inward vertical extremity A of the vertical supports 14 are spaced horizontally from the tip adjacent thereto a distance V which is no greater than one hundred twenty percent (120%) of the horizontal distance Z of the end sections 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly for blowing liquids from the surfaces of a vehicle comprising:

a support plenum (10) for distributing a stream of air to the surfaces of a vehicle, a blower (16) connected to said support plenum (10) for producing said stream of air, an overhead bag (18) extending downwardly from said plenum (10) to a distal end, a nozzle disposed at said distal end, said nozzle including a center section (20) having a length (Y) extending horizontally between ends (23) for directing air against the top of a vehicle, said nozzle characterized by including two inwardly directed end sections (22), one at each end (23) of said center section (20) to define two outward tips (24) of said nozzle for directing air downwardly against the sides of a vehicle, said end sections (23) extend at an angle (θ) to slant downwardly and outwardly from the side of the vehicle.

2. An assembly as set forth in claim 1 including a vehicle positioner (30) for positioning the sides of the vehicle horizontally inwardly of said tips (24) of said nozzle.

3. An assembly as set forth in claim 1 wherein each of said end sections (22) extends a horizontal distance (Z) which is fifteen to twenty five percent of said horizontal length (Y) of said center section (20).

4. An assembly as set forth in claim 3 wherein each of said end sections (22) extends a horizontal distance (Z) which is twenty percent of said horizontal length (Y) of said center section (20).

5. An assembly as set forth in claim 1 wherein said overhead bag (18) comprises fabric and includes major gussets (26) extending from said plenum (10) to said nozzle to divide said overhead bag (18) into panels, each of said end sections (22) including three of said panels (27).

6. An assembly as set forth in claim 5 wherein said center section (20) includes fifteen of said panels.

7. An assembly as set forth in claim 6 wherein said overhead bag (18) includes minor gussets (28) extending inwardly from said nozzle a distance short of said plenum (10).

8. An assembly as set forth in claim 1 wherein each of said end sections (22) extends a horizontal distance (Z) of twelve inches and said horizontal length (Y) of said center section (20) is at least sixty inches.

9. An assembly as set forth in claim 1 wherein each of said end sections (22) extends a predetermined horizontal distance (Z), said plenum (10) includes an overhead support (12) and at least one vertically extending side support for supporting said overhead support (12), said side support having an inward vertical extremity (A), said vertical extremity (A) being spaced horizontally from the one of said tips (24) adjacent thereto a distance (V) which is no greater than one hundred twenty percent of said horizontal distance (Z) of said end sections (22).

10. An assembly as set forth in claim 1 wherein each of said end sections (22) extends a predetermined horizontal distance (Z), said plenum (10) includes an overhead support (12) and two vertically extending side supports (14), said overhead support (12) extending between said side supports (14), each of said side supports (14) having an inward vertical extremity, said vertical extremities (A) being spaced horizontally apart a distance (X) of one hundred fifteen inches, the horizontal distance (S) between said tips (24) of said end sections (22) being eighty four inches with said tips (24) being equally spaced (V) from said vertical extremities (A) of said vertical side supports (14).

11. An assembly as set forth in claim 10 wherein each of said end sections (22) extends a horizontal distance (Z) of twelve inches.

12. An assembly as set forth in claim 11 wherein said end sections (22) of said nozzle extend at an angle (θ) of one hundred and thirty five degrees relative to the center (20) of said nozzle.

13. An assembly as set forth in claim 1 wherein said center section (20) extends horizontally straight and said end sections (22) of said nozzle extend at an angle of forty five degrees relative to said center section (20) of said nozzle.

14. An assembly as set forth in claim 1 wherein said overhead bag (18) comprises fabric and includes major gussets (26) extending from said plenum (10) to said nozzle to divide said overhead bag (18) into panels (27), a plurality of said panels (27) defining each of said end sections, and wherein said end sections (22) of said nozzle extend in a straight line at an obtuse angle (θ) of not more than one hundred and thirty five degrees relative to said center section (20) of said nozzle (22).

15. An assembly as set forth in claim 1 wherein said overhead bag (18) comprises fabric and includes major gussets (26) extending from said plenum (10) to said nozzle to divide said overhead bag (18) into panels (27), a plurality of said panels (27) defining each of said end sections (22), and wherein said end sections (22) of said nozzle extend in a straight line at an obtuse angle (θ) relative to said center section (20) of said nozzle, one of said major gussets (26) being disposed at the intersection of said center and end sections (22) of said nozzle.

16. An assembly as set forth in claim 1 wherein said overhead bag (18) comprises fabric and includes major gussets (26) extending from said plenum (10) to said nozzle to divide said overhead bag (18) into panels (27), each of said end sections (22) including a plurality of said panels (27) with one of said panels (27) being immediately adjacent said center section (20) of said nozzle, a vehicle positioner (30) for positioning the sides of the vehicle horizontally inwardly of said tips (24) of said nozzle, said positioner (30) being centered within the horizontal extent of said one of said panels (27).

17. An assembly for blowing liquids from the surfaces of a vehicle comprising:

a support plenum (10) for distributing a stream of air to the surfaces of a vehicle, a blower (16) connected to said support plenum (10) for producing said stream of air, an overhead bag (18) extending downwardly from said plenum (10) to a distal end, a nozzle disposed at said distal end, said nozzle including a center section (20) having a length (Y) extending horizontally between ends (23) for directing air against the top of a vehicle, said nozzle characterized by including two inwardly directed end sections (22), one at each end (23) of said center section (20) to define two outward tips (24) of said nozzle for directing air downwardly against the sides of a vehicle said overhead bag (18) comprising fabric and including major gussets (26) extending from said plenum (10) to said nozzle to divide said overhead bag (18) into panels (27), a plurality of said panels (27) defining each of said end sections, said center section (20) extending horizontally straight and said end sections (22) of said nozzle extending in a straight line at an obtuse angle ($\theta$) relative to said center section (20) of said nozzle (22), said gussets (26) directing the flow of air from said end sections (22) parallel to the flow of air from said center section (20).

* * * * *